United States Patent
Cheol

(10) Patent No.: US 8,130,698 B2
(45) Date of Patent: Mar. 6, 2012

(54) CHANGING AN OPERATION STATE AND RECOVERING A NETWORK OF A WLAN DEVICE

(75) Inventor: Kang Seong Cheol, Osan-si (KR)

(73) Assignee: LG Electronics Inc., Seoul (KR)

( * ) Notice: Subject to any disclaimer, the term of this patent is extended or adjusted under 35 U.S.C. 154(b) by 911 days.

(21) Appl. No.: 11/462,861

(22) Filed: Aug. 7, 2006

(65) Prior Publication Data
US 2007/0037547 A1 Feb. 15, 2007

(30) Foreign Application Priority Data

Aug. 9, 2005 (KR) .................... 10-2005-0072813

(51) Int. Cl.
*H04W 4/00* (2009.01)
(52) U.S. Cl. ........ 370/328; 370/311; 370/318; 370/338; 713/300; 713/310; 455/418; 455/420
(58) Field of Classification Search .......... 455/418–420, 455/574; 709/224; 713/320, 330, 340, 300, 713/310; 370/311, 318, 328
See application file for complete search history.

(56) References Cited

U.S. PATENT DOCUMENTS

| | | | |
|---|---|---|---|
| 2002/0068618 A1* | 6/2002 | Shoobridge | 455/574 |
| 2004/0203363 A1* | 10/2004 | Carlton et al. | 455/41.2 |
| 2005/0066158 A1* | 3/2005 | Mowery et al. | 713/2 |
| 2005/0066340 A1* | 3/2005 | Mathur et al. | 719/328 |
| 2005/0102682 A1* | 5/2005 | Shah et al. | 719/321 |
| 2005/0198257 A1* | 9/2005 | Gupta et al. | 709/224 |
| 2005/0262562 A1* | 11/2005 | Gassoway | 726/22 |
| 2006/0274753 A1* | 12/2006 | Park et al. | 370/392 |
| 2006/0286930 A1* | 12/2006 | Rathus et al. | 455/26.1 |

* cited by examiner

*Primary Examiner* — Kamran Afshar
*Assistant Examiner* — Kathy Wang-Hurst
(74) *Attorney, Agent, or Firm* — Fish & Richardson P.C.

(57) ABSTRACT

Access to a wireless local area network (WLAN) is controlled by identifying a D3 system event. The wireless local area network device associated with the D3 system event is removed and the removal of the wireless local area network device is reported to a wireless local area network device manager. A driver of the wireless local area network device is unloaded and any remaining wireless local area network devices within the wireless local area network are powered down.

14 Claims, 6 Drawing Sheets

CHANGING AN OPERATION STATE AND RECOVERING A NETWORK OF A WLAN DEVICE

BACKGROUND

This description relates to wireless local area networks and wireless local area network (WLAN) devices.

Wireless local area network (WLAN) devices or systems generally include apparatuses utilizing a radio frequency (RF) device, such as a Personal Digital Assistant (PDA), a Bluetooth device, and/or a WLAN card (e.g., a WLAN PCI/PC card).

Generally, WLAN devices include portable terminals that provide wireless communication functions. For example, WLAN devices may include mobile communication terminals, personal communication service (PCS) terminals, personal digital assistants (PDAs), smartphones, mobile telephone terminals, and WLAN terminals. RF cards and expansion packs, such as personal computer memory card international association (PCMCIA) card type expansion packs and compact flash (CF) card type expansion packs, further support wireless communication services.

Generally, a 10/100 BASE-T Ethernet interface in accordance with IEEE (Institute of Electrical and Electronics Engineers) 802.3 is provided for wired processing, and 2 Mbps transmission is provided in 2.4 GHz frequency band in accordance with IEEE 802.11 for wireless processing. The entirety of the 802.3 and 802.11 specifications are hereby incorporated by reference.

A WLAN device may include one or more power states, including, for example, a "D0" power state and a "D3" power state. The D0 power state, which may be referred to as a Resume, Wake-up, or other state activating from a Standby state, refers to preparing a device that may be operating in an inactive or standby state for normal operation. The D3 power state, which may be referred to as a Sleep, Power down, Power off, or Standby state, refers to an inactive or standby state of the device. In the D0 state, the device is receiving full power from the system, and/or is delivering full functionality to the user. In the D3 state, the device is generally powered off or operating at a reduced power, idle state.

SUMMARY

In one general aspect, a method for controlling access to a wireless local area network (WLAN) includes identifying a D3 system event. A wireless local area network device associated with the D3 system event is removed and the removal is reported to a wireless local area network device manager. A driver of the wireless local area network device is unloaded and any remaining wireless local area network devices within the wireless local area network are powered down.

Implementations may include one or more of the following features. For example, a D0 system event associated with a wireless local area network device may be identified and any remaining wireless local area network devices other than the wireless local area network device associated with the D0 event may be powered up. A driver of the wireless local area network device associated with the D0 event may be loaded. A connection may be recovered using previously stored access point (AP) information. The wireless local area network device associated with the D0 event may be powered up after powering up any remaining wireless local area network devices other than the wireless local area network device associated with the D0 event.

The D3 event may include at least one event selected from the group consisting of a sleep event, a standby event, a battery-off event, and an off event by a scheduler.

The wireless local area network device associated with the D3 event may be powered down after the powering down of the other wireless local area network devices.

The D0 event may include at least one event selected from the group consisting of a wake-up event, a real time clock event, a scheduler event, and a button input event.

The driver of the wireless local area network device associated with the D0 event may be loaded to recover an access point connection responsive to the D0 event.

In another general aspect, recovering a network of wireless local area network devices includes detecting a power state change request and switching a wireless local area network device to a state corresponding to the detected power state change request. In addition, a driver of the wireless local area network device is loaded and an access point connection is recovered.

Implementations may include one or more of the following features. For example, the wireless local area network device may switch to a D0 mode based on the power state change request.

In another general aspect, recovering a network of wireless local area network devices includes detecting a power state change request. A wireless local area network device is switched to a state corresponding to the detected power state change request. A driver of the wireless local area network device is unloaded and an access point connection is removed.

Implementations may include one or more of the following features. For example, the wireless local area network device may be associated with a D3 mode. A removal of the wireless local area network device associated with the D3 mode may be reported and an access point connection state may be stored. A power-down control may be performed on at least one other wireless local area network device.

Any other remaining wireless local area network devices may be powered up before powering up the wireless local area network device associated with the power state change request. An operative connection with the wireless local area network device may be reported and hardware may be initialized by loading the driver of the wireless local area network device. The connection state may be recovered using a previously stored access point information.

In another general aspect, an apparatus for changing an operation state and recovering a network of wireless local area network devices includes a wireless local area network device configured to connect to an access point. A driver is configured to report a power state for a wireless local area network device corresponding to an event generated from a system. A wireless local area network device manager is configured to perform at least one of detecting an insertion and a removal of the wireless local area network device according to the event, managing power of the wireless local area network device, and unloading and loading a wireless local area network device driver according to the reporting from the driver. A power manager is configured to control power down and power up states of the wireless local area network device manager and the driver based on the insertion and removal of the wireless local area network device.

Implementations may include one or more of the following. For example, a compact flash (CF) driver may be configured to detect a power state of the wireless local area network device and to report the request to the wireless local area network device manager if a change request is detected.

The compact flash driver and the wireless local area network device driver may be integrated into a single driver.

In another general aspect, changing an operation state and recovering a network of a wireless local area network device in a network system includes determining whether a power state mode is changed. A removal of the wireless local area network device based on the determination is reported and a connection state of an access point of the wireless local area network device is cleared. A driver of the wireless local area network device is unloaded and other devices except the wireless local area network device are powered down. The network system is switched to a preset mode.

Implementations may include one or more of the following features. For example, the preset mode may be a D3 (Sleep) mode.

In another general aspect, changing an operation state and recovering a network of a wireless local area network device in a network system includes determining whether a power state mode is changed. Other devices except the wireless local area network device are powered up based on the determination. An insertion of the wireless local area network device is detected and a driver of the wireless local area network device is loaded. A connection for an access point of the wireless local area network device is performed and the network system is switched to a preset mode.

Implementations may include one or more of the following features. For example, hardware may be initialized by loading the driver of the wireless local area network device.

The preset mode may be a D0 (Resume) mode.

In another general aspect, controlling access to a wireless local area network (WLAN) includes identifying a system event for a WLAN device with a WLAN device manager. A power management signal is sent to a power manager, and the power management of the WLAN device is controlled in response to the power management signal. Access point connection information is stored and a WLAN device driver is unloaded.

In another general aspect, controlling access to a wireless local area network (WLAN) includes identifying a system event for a WLAN device with a WLAN device manager. A power management signal is sent to a power manager, and a WLAN device driver is unloaded. Stored access point connection information is recovered and the power management of the WLAN device is controlled in response to the power management signal.

Other features will be apparent from the following description, including the drawings, and the claims.

DETAILED DESCRIPTION

WLAN devices are currently being used in offices, retail stores, and large industrial facilities, such as factories and warehouses. WLAN devices receive and transmit data among computers, printers, repeater access pointers (APs), and other devices, without the necessity of a wired network.

Figure 1:
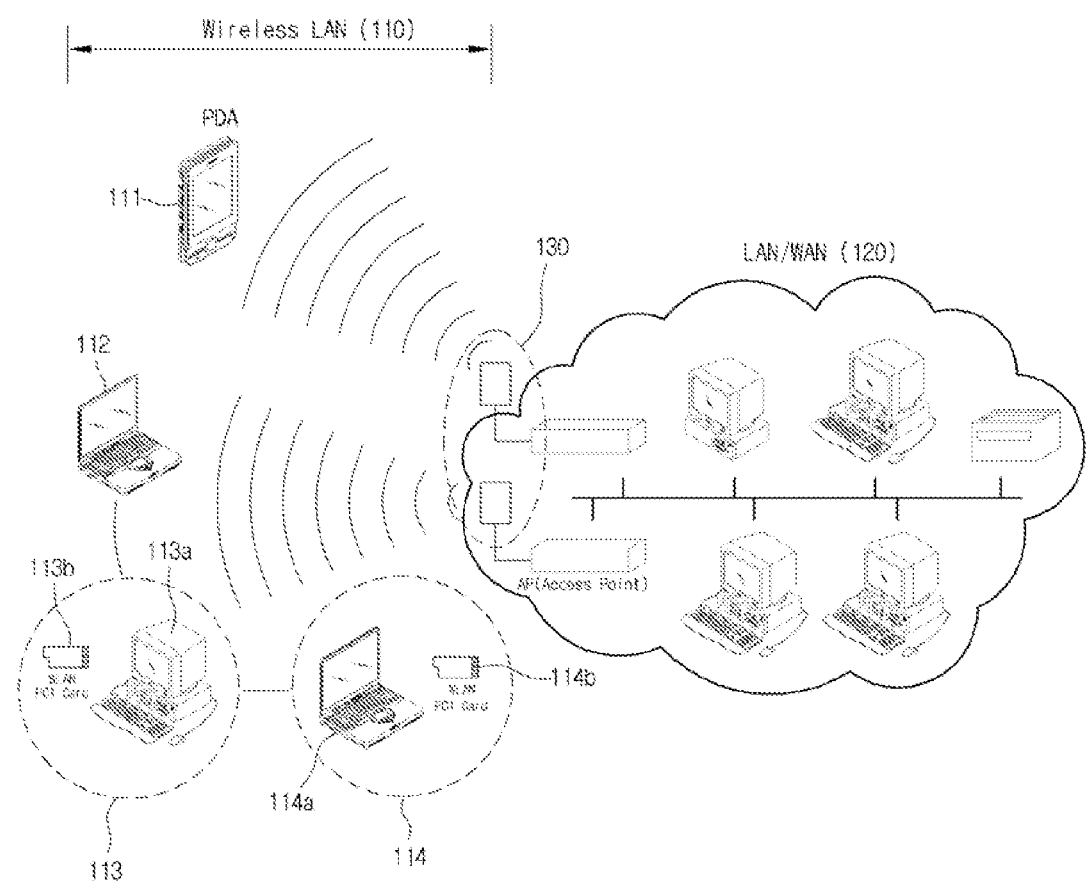
FIG. 1 is a block diagram of a WLAN configuration.

FIG. 1 is a block diagram showing an exemplary WLAN configuration. Referring to FIG. 1, the WLAN configuration includes a Wireless LAN 110 capable of wireless communication and connected to a LAN/WAN 120 through cables. The WLAN configuration further includes an access point (AP) 130 acting as a repeater for wireless communication between the Wireless LAN 110 and the LAN/WAN 120.

The Wireless LAN 110 includes a PDA 111, a first computer 112, a second computing station 113 having a computer 113a provided with a WLAN PCI card 113b, and a third computing station 1114 having a computer 114a provided with a WLAN PC card 114b.

Figure 2:
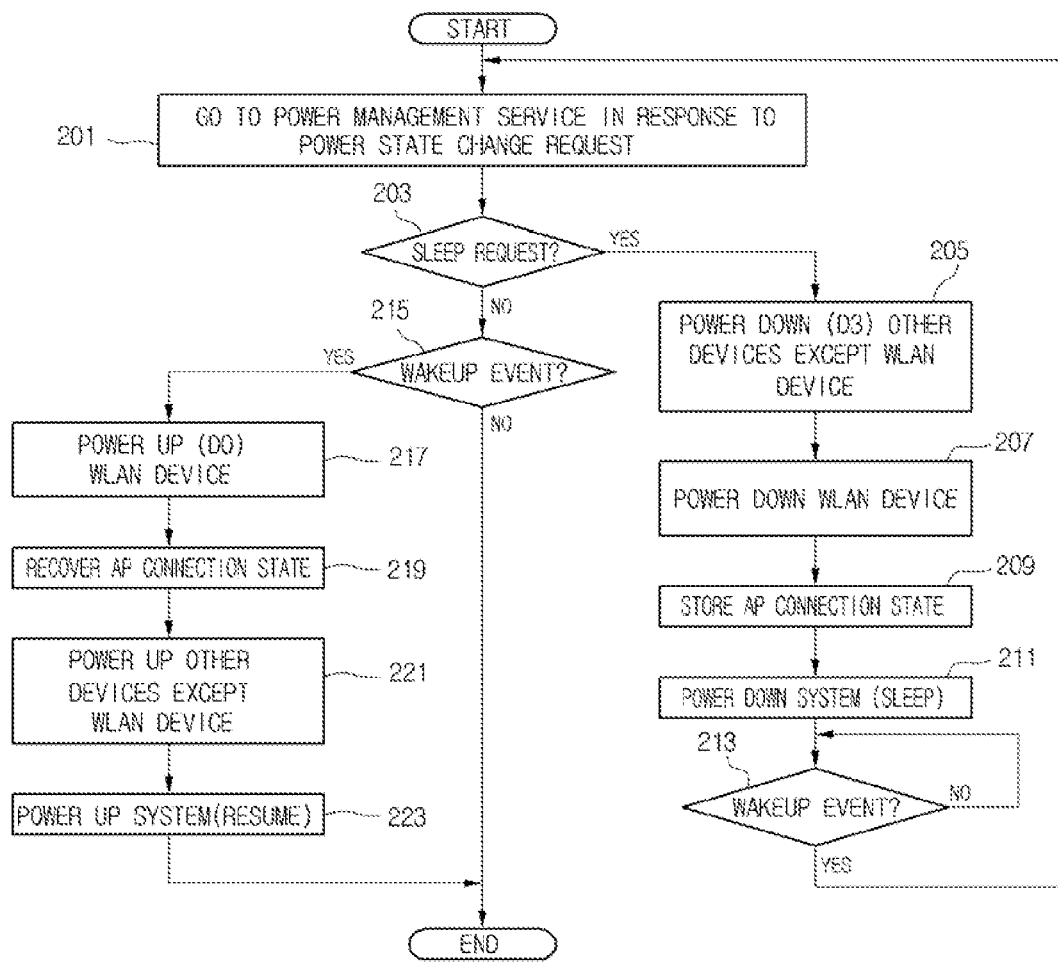
FIG. 2 is a flowchart of a process for recovering a WLAN connection of a WLAN device.

Referring to FIG. 2, if a power state change request is detected from a WLAN device (e.g., a PDA or a RF device), a power management service mode is enabled (201). The power state change request is detected when the WLAN device is idle for a preset time period, or if a user requests the power state change. If a D3 (Sleep) mode request is detected (203), the process proceeds to step 205. A D3 mode request may be generated, for example, when the current mode is the D0 mode and the current D0 mode should be changed to the D3 mode due to a period of inactivity. If a sleep request is not detected, the process proceeds to step 215 where a determination is made as to whether a D0 (Wake-up event) mode request has been detected from the WLAN device.

When a sleep request has been detected (203), the remaining devices within the system other than the WLAN device are first powered down (205). The WLAN device then is powered down after the other devices are powered down (207). In addition, the connection state of an AP is stored (209), and the system is powered down for operating in the D3 mode (211).

If a power state change request is detected by the system subsequent to switching to the D3 mode, the power state change request is assessed to see if the request is a wakeup event (213). If it is determined that the request is a D0 (Wake-up) mode request (213 or 215), the WLAN device is powered up (217), and the connection state of the AP is restored (219). The other WLAN devices within the system are powered up (221), and the system is powered up (223) to operate in the D0 mode.

If the system switches to the D3 mode as described in the process in FIG. 2, a power-down request for the WLAN device is sent to an operating system. If the system switches to the D0 mode, the WLAN device is powered up and the connection state of the AP is recovered to return the system to the former operating state. An exemplary power management process for a network device is further described in "Device Class Power Management Reference Specification," Network Device Class V2.0 (Oct. 12, 2000), co-authored by Microsoft and Advanced Micro Devices, Inc, the entirety of which is hereby incorporated by reference.

However, system initialization may provide inconsistent recovery of network information and/or powering up of the WLAN device. For example, it is possible to encounter recovery failure rates of approximately 4% in the connection recovery (e.g., 40 occurrences per 1000 trials) using the aforementioned procedures. Since the WLAN device manages only powering up and down, various parameters for WLAN driver connection are not always recovered in their entirety.

Figure 3:
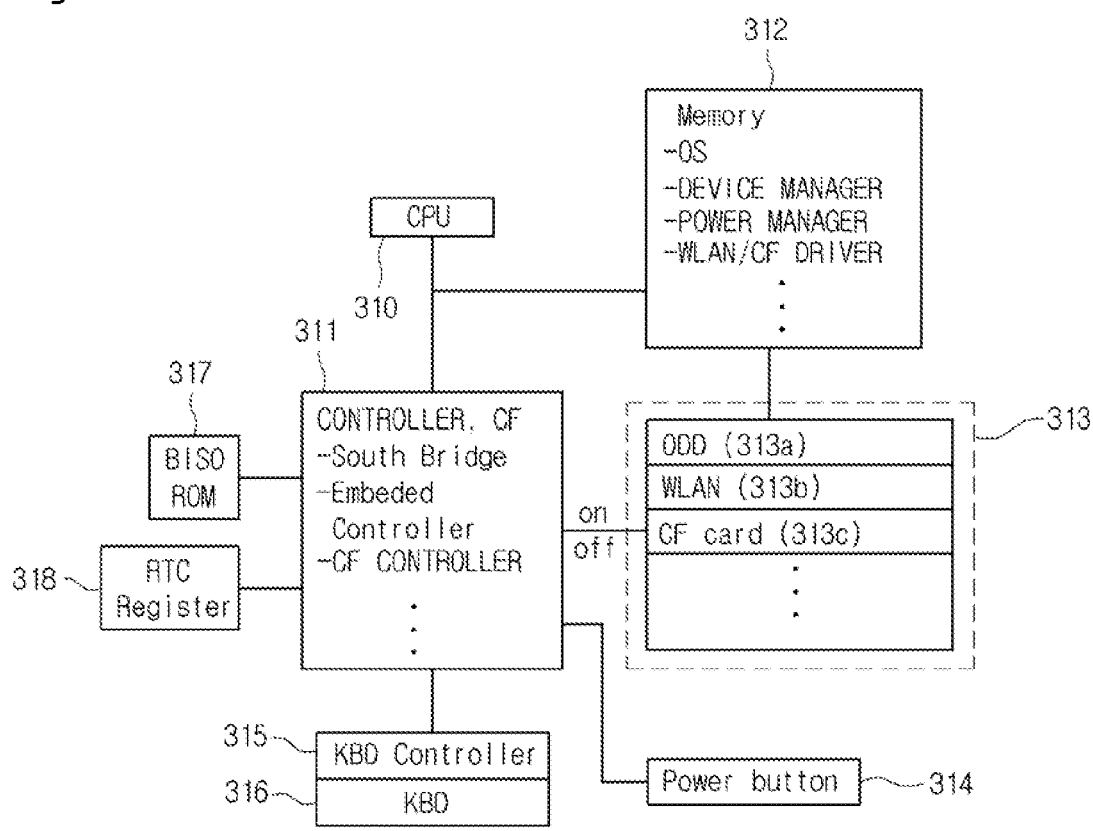
FIG. 3 is a block diagram of a system connected to a WLAN device.

Referring to FIG. 3, an exemplary system includes a central processing unit (CPU) 310 controlling the overall operation of the system, a controller 311 connected with the CPU 310 for performing at least one of a system memory bus input and output control function and a peripheral device input and output function, a main memory unit 312, a peripheral device 313, a BIOS ROM 317, a keyboard (KBD) 316, a KBD controller 315, an RTC resister 318, and a power button 314. The main memory unit 312 stores at least one of an operating system, a power control program, and a WLAN device operating program. The peripheral device 313 is controlled by the controller 311 and may include an optical disc drive (ODD) 313a having an optical recording medium, a WLAN 313b, and a compact flash (CF) card 313c or another memory card. The BIOS ROM 317 stores a program for controlling a basic operation of the system. The KBD controller 315 controls the KBD 316.

Figure 4:
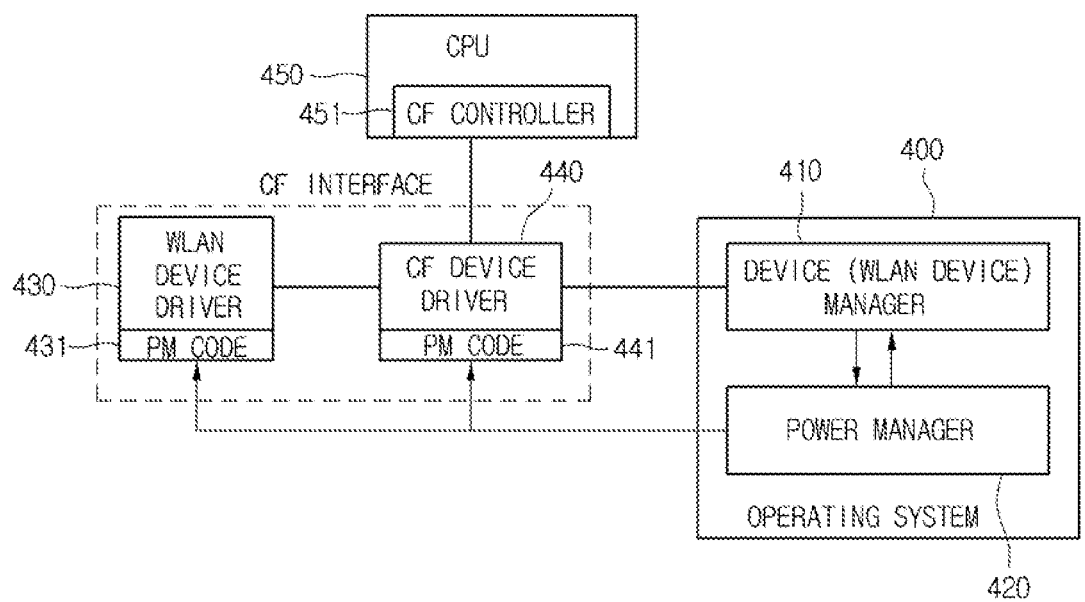
FIG. 4 is a block diagram of an apparatus for recovering a network of a WLAN device.

Referring to FIG. 4, an apparatus for recovering the network of a WLAN device includes an operating system 400 provided with a WLAN device manager 410 controlling a state of the WLAN device (not shown) and a power manager 420 managing a power state of the WLAN device. The apparatus includes a CF interface that includes a WLAN device driver 430 powered on and off by the power manager 420, and a CF driver 440 for detecting the power state of the WLAN device and reporting the detection result to the device manager if a power state change request is detected. The apparatus also includes a CPU 450 provided with a CF controller 451 connected to the WLAN device driver 430 through the CF interface. Alternatively, the CF driver 440 and the WLAN device driver 430 can be integrally formed in a single driver.

The operating system 400 automatically manages the power state and connection state of the WLAN device. The operating system 400 monitors events arising from the system to manage the states of all network devices and processes plug and play functions in response to insertion and ejection of the WLAN device and/or other similar devices. The operating system 400 may include the WLAN device manager 410, the power manager 420, and other units.

The WLAN device manager 410 determines if an event arising from the WLAN system corresponds to a D3 (Sleep) mode or a D0 (Wake-up) mode. An event corresponding to the sleep mode D3 may include resetting, soft resetting, standby mode, battery off, and idle time set by a scheduler. An event corresponding to the wake-up mode includes a real time clock (RTC) alarm, an on time set by the scheduler, and a transition state when a power or user button is pressed. The events act as triggers for the sleep and wake-up modes that are generated in response to a user request or a set trigger. Further, the event may include a system wake-up event, a sleep event, a link state, and/or another state of the WLAN device.

If the WLAN device manager 410 determines that the event arising from the WLAN system corresponds to the D3 mode, the WLAN device manager 410 powers down the system or the WLAN device, and controls a RF device of the WLAN device. The RF device can be a modular device mounted on a slot of the system, and may be controlled by software through the WLAN device driver 430.

In a D3 mode, the RF device is off (not running), power to the RF device is removed, and the contents of the RF device are erased. The RF device stores information required for its operation, and this information is referred to as the device context.

The WLAN device manager 410 sends a signal, e.g., an interrupter signal, relating to the power management of the WLAN device to the power manager 420, and the power manager 420 controls the power management (PM) of the WLAN device according to the WLAN device power management signal. The power manager 420 powers down the WLAN device (not shown) using a PM code 431. PM codes 431 and 441 are power down and up routine codes for the WLAN device driver 430 and the CF driver 440, respectively.

If the WLAN device is powered down, the CF driver 440 detects the power state change of the WLAN device and sends a removal event to the WLAN device manager 410 to detect if the WLAN device is powered down. The WLAN device manager 410 unloads the WLAN device driver 430 according to the removal event of the WLAN device, and manages power. Further, the WLAN device manager 410 powers down other WLAN devices and then powers down the system power.

In order to remove the WLAN device driver 430 in response to the removal event, the CPU 450 unloads the WLAN device driver 430 from a RAM (not shown), powers down the WLAN device internally, and receives a power-down message from the CF controller 451. The system power is down and the sleep mode continues until a wake-up event arises.

If the power button 314 is pressed again or a real time event which the system recognizes as a wake-up event occurs, the WLAN device manager 410 communicates with the power manager 420. The power manager 420 controls PM codes of the WLAN device driver 430 and other WLAN devices for powering up the device (D0: Wake-up). In the D0 state of the network system, the WLAN device is receiving full power from the system and is delivering full functionality to the user.

The WLAN device driver 430 is held in standby for a preset time period, e.g., about one second after an event is detected that indicates a WLAN device has been inserted into the system (not shown), and the WLAN device manager 410 loads the WLAN device driver 430. If a WLAN device is detected, the WLAN device driver 430 is loaded. The WLAN device driver 430 initializes the WLAN device, e.g., a WLAN card, and restores the WLAN device to the previous state before the sleep mode by reconnecting the WLAN device using previous AP connection information from a network driver interface specification (NDIS). The NDIS is a network protocol service of the operating system 400 dedicated to network interface cards (NICs). The NDIS is an interface specification used in Microsoft Windows NT or other systems for communication between network cards/drivers and network layers.

The CF driver 440 is provided for the CF card 313a or another WLAN device. The CF driver 440 is a device driver for an interface layer connecting the CF controller 451 in the CPU 450 with various CF devices. Examples of the CF device include a CF memory card, a CF Modem card, a CF WLAN card, and a CF GSM card. Devices that operate on a PC system through a CardBUS or PCMCIA socket are other examples of the CF device. The CF driver 440 generally sends a corresponding event to the system when a CF card, such as a WLAN device, is installed, and responds to a CID check when the WLAN device manager 410 inquires about the type of a WLAN device mounted on a CF slot. Therefore, a client driver, such as a device driver 430 corresponding to a WLAN device, of the installed device (e.g., a WLAN device) can be loaded, and the installed device can be operated normally. The CF driver 440 functions as a pathway for the data interface between the system and WLAN devices, including installed devices.

Figure 5:
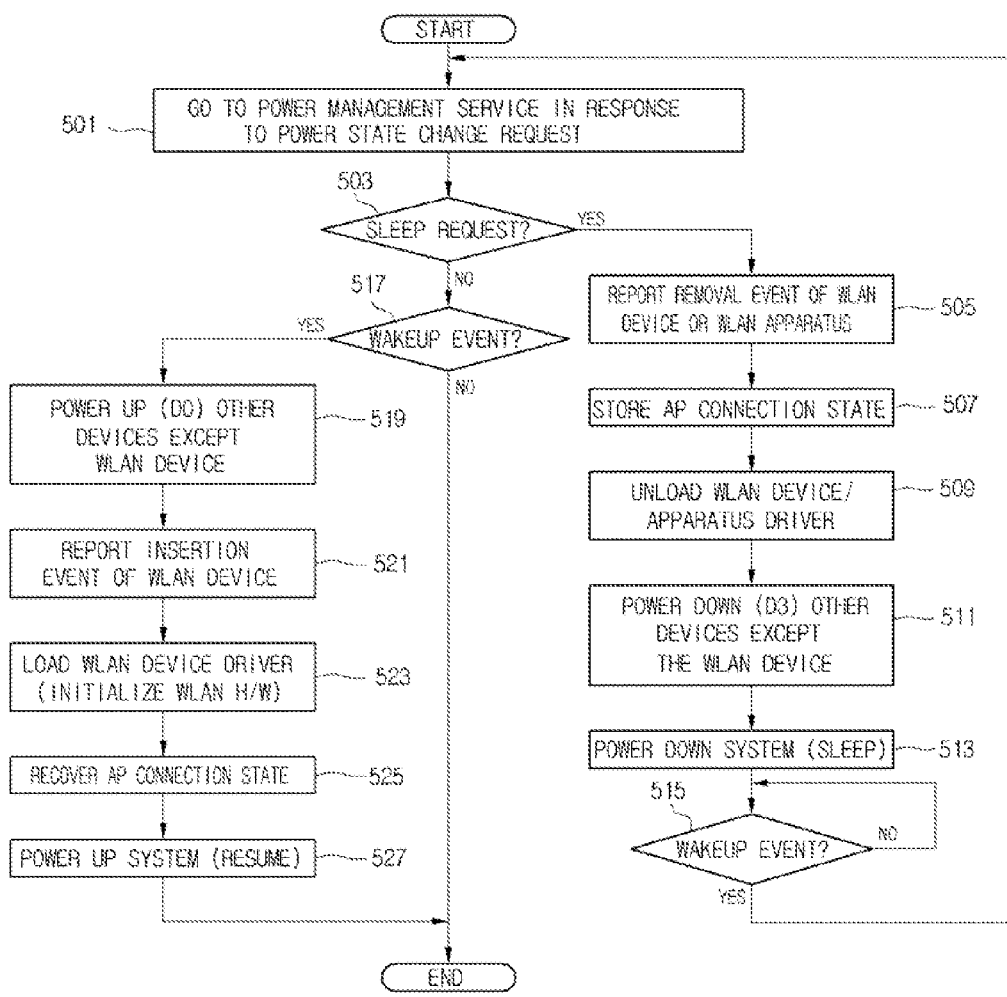
FIG. 5 is a flowchart of a process for recovering a network of a WLAN device.

Referring to FIG. 5, a process for recovering a WLAN device begins when the system detects a power state change request of a WLAN device (501). The power state change request includes a hardware event and a software event. For example, the power state request may include a button pressing action or a power on and off time set in a scheduler.

If a power button is pressed by the user or an automatic sleep time period set by a user is exceeded, a sleep request event is generated for operating the system in sleep mode. A power manager of the system performs a power state change request.

If the power state change request is detected, it is first determined if the power state change request is a sleep mode request (503) or a wake-up mode request (517). If the current operating state is a wake-up mode, the system first checks if the power state change request is a sleep mode request. If the current operating state is a sleep mode, the system checks if the power state change request is a wake-up mode request.

If the power state change request is a sleep mode request, a removal event of the WLAN device is reported (505), and a current AP connection state is stored (507). The operation with the AP is performed in accordance with a WLAN specification such as, for example, IEEE 802.11. The removal event of the WLAN device is generated in the operation system by a CF driver that manages WLAN device drivers. However, the current AP connection state may not be stored if the current AP connection state is the same as the previously stored wake-up mode.

Thereafter, a WLAN device driver loaded in a system memory is unloaded (509). Any remaining WLAN devices (e.g., devices other than the WLAN device of which the driver is being unloaded) are powered down (511). Since power management is not required for the WLAN device which is unloading the driver, the power management is performed only on the other remaining WLAN devices.

Powering down refers to the removal of power and clock signals typically sent from the system to the WLAN devices, which may include, for example, a WLAN card, an audio device, and a video device, to reduce power consumption. Powering down operations are controlled by drivers of the WLAN devices installed in the system. After the WLAN devices are powered down, the system is powered down (513).

Once the system is powered down to operate in the sleep mode, the system continues in this state until a wake-up event arises. When a wake-up event request is generated and detected (515 or 517), the other remaining WLAN devices are first powered up (D0) (519). The powering-up of the other WLAN devices is controlled by the drivers of the other WLAN devices and includes providing power and clock signals to the other WLAN devices.

Next, the insertion of the WLAN device is reported to the operating system (521), and the operating system loads the respective WLAN device driver (523). The CPU loads the WLAN device driver in RAM, and the WLAN device, e.g., a LAN card, is initialized. After the WLAN device driver is loaded, the AP connection state is restored to the previously stored state (525), and the system power is restored (D0, Resume) (527).

Thus, if the power state change request is a sleep mode request, the removal event of the WLAN device is reported to the operating system, and the system unloads the WLAN device driver and stores the current AP connection state. The remaining other devices and system are subsequently powered down, such that the network devices and related power consumption can be more managed more effectively.

The power manager performs the WLAN device management service according to whether the power state change request is a sleep mode request or a resume mode request. However, if there is an unrecognized or unregistered request, the operating system shuts down the power manager. The operating system waits for a preset time, for example, approximately 3 seconds, after the removal of the WLAN device is reported, and the operating system unloads the WLAN device driver from the WLAN device manager. The other WLAN devices are powered down under the control of the WLAN device manager, and the system enters theسleep mode. The preset time period may be a time period preset by the system or a time period set by the user for adequately preparing for the unloading of the driver.

When the wake-up event is generated, the system recalls the power manager. The power manager determines if the event is a resume request, and the power manager proceeds to a corresponding service routine if the event is a resume request. In the resume service request, the power manager uses a WLAN device manager service call to call a power up (D0) function of the other WLAN devices that are in a powered-down state (D3) to return the other WLAN devices to a powered-up state (D0).

The WLAN device is held in standby state for a predetermined time, e.g., approximately 1 second, after the insertion event is generated, and a corresponding WLAN device driver is loaded by the WLAN device manager. After the loaded WLAN device driver initializes the hardware of the WLAN device, the WLAN device driver reconnects based on the previous AP connection information and using a network protocol service of the operating system, e.g., NDIS. When the system is powered up, the system is restored to the previous operating state before the system was in a sleep mode. Accordingly, the powering up and down operations of the WLAN devices are performed with software in a manner transparent to the users.

If the power state change request is detected, the system receives notice of the removal or insertion of a WLAN device in response to the power state change request. The system unloads and loads the driver of the WLAN device, and the device driver can be managed more efficiently. Accordingly, the recovery of the AP connection recovery is performed reliably, even if the system is repeatedly switched between the sleep mode and the wake-up mode.

Figure 6:
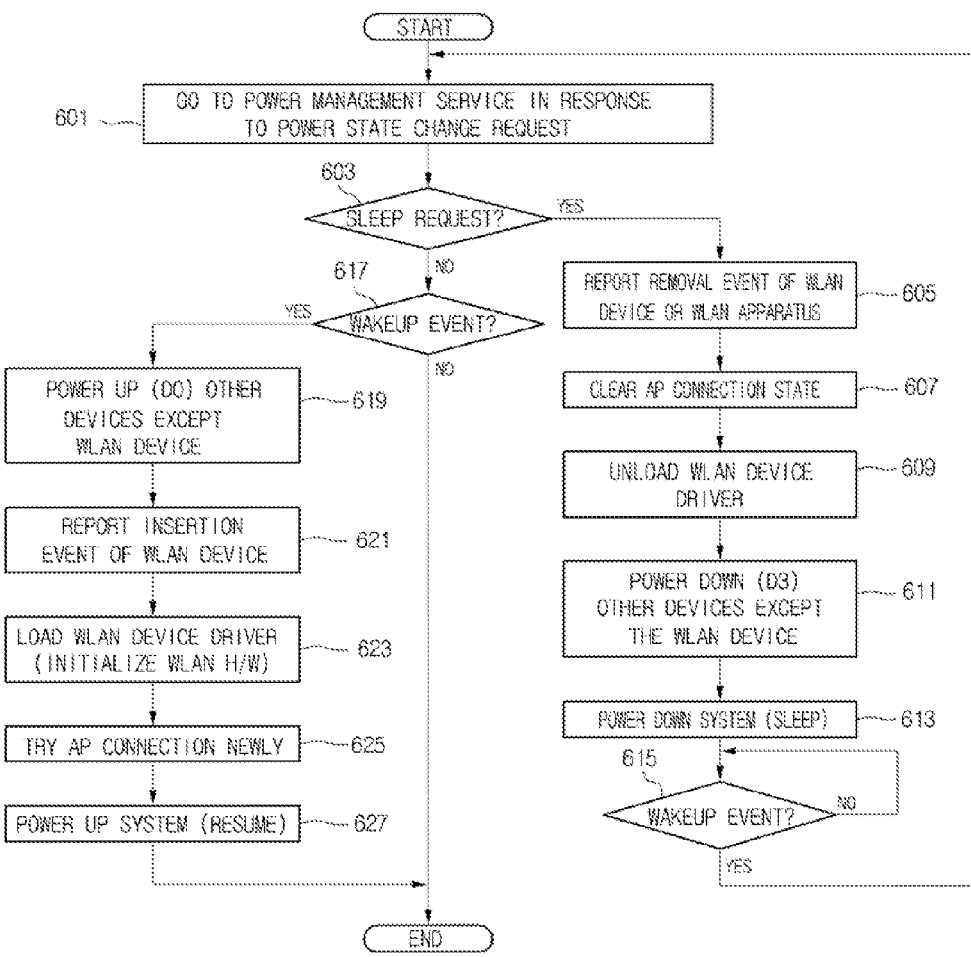
FIG. 6 is a flowchart of a process for recovering a network of a WLAN device.

Referring to FIG. 6, the exemplary recovery process is similar to that described with reference to the process of FIG. 5. However, if the power state change request is a sleep mode request, a removal event of the WLAN device is reported to the system (605), and a current AP connection state is cleared (607). The AP connection state is cleared (607) instead of storing the AP connection state, e.g., such as in step 507 shown in FIG. 5.

Since the WLAN device driver can be unloaded (e.g., Zero Config of the operating system can be initialized after the removal of the WLAN device), the AP connection state is cleared. If the operation of the WLAN device driver is later resumed, a connection attempt can be initiated using the initialized information.

Further, if an insertion event is reported (621), and the AP connection is recovered, such as by using the previously stored AP connection information in operation 525 of FIG. 5, the AP connection may also be attempted (625) with a new connection to power up the system (resume) (627).

If the system repeatedly switches between the sleep mode and the wake-up mode, the AP connection recovery can be performed efficiently and power management can be effectively performed on other network devices. In addition, power to the WLAN device may be managed by notifying the system of the removal and insertion event of the corresponding WLAN device when the sleep and resume events are generated. The power manager performs the power management on the corresponding WLAN device, remaining WLAN devices, and the system.

Therefore, a network device driver is provided that is more event-adaptable and stable, and a more stable connection recovery service for the network device is provided by automatically detecting the removal and insertion of the WLAN device. The management of power can be more effectively performed in response to the notification of the network removal and insertion of a device.

Various modifications, additions and substitutions are possible. Accordingly, other implementations are within the scope of the following claims.

What is claimed is:

1. An apparatus for utilizing a removal event in managing a wireless local area network device, the apparatus comprising:
   a plurality of devices, including a wireless local area network device, the wireless local area network device being associated with a device manager; and
   a system including the device manager, the system being configured to:
      receive a user input to power off the apparatus,
      generate a notification of a removal event of the wireless local area network device in response to the received user input to power off the apparatus, wherein the notification of the removal event indicates a request to remove the wireless local area network device from the apparatus,
      send the notification of the removal event of the wireless local area network device to the device manager,
      in response to the device manager receiving the notification of the removal event of the wireless local area network device:
         store access point connection information of the wireless local area network device,
         unload a driver of the wireless local area network device, and
         power down the wireless local area network device, and
      power down the plurality of devices of the apparatus other than the wireless local area network device and power down the apparatus in response to the received user input to power off the apparatus.

2. The apparatus according to claim 1, wherein a compact flash driver is configured to detect a power state of the wireless local area network device and to report a change request to the device manager if a change request is detected.

3. The apparatus according to claim 2, wherein the compact flash driver and the device driver are integrated into a single driver.

4. The apparatus of claim 1, wherein the store access point connection information includes information regarding a second wireless local area network device to which the wireless local area network device is connected prior to being powered down.

5. A method of utilizing a removal event in managing a wireless local area network device in a network system, the method comprising:
   receiving a user input to power off a system, the system including a plurality of devices including a wireless local area network device;
   generating a notification of a removal event of the wireless local area network device in response to the received user input to power off the system, wherein the notification of the removal event indicates a request to remove the wireless local area network device from the system;
   sending the notification of the removal event of the wireless local area network device to a device manager associated with the wireless local area network device;
   in response to the device manager receiving the notification of the removal event of the wireless local area network device:
      storing access point connection information of the wireless local area network device,
      unloading a driver of the wireless local area network device, and
      powering down the wireless local area network device; and
   powering down the plurality of devices of the system other than the wireless local area network device and powering down the system in response to the received user input to power off the system.

6. The method according to claim 5, wherein powering down the wireless local area network device includes switching the wireless local area network device into a D3 mode.

7. The method according to claim 6, wherein the D3 event comprises at least one event selected from the group consisting of a sleep event, a standby event, a battery-off event, and an off event by a scheduler.

8. The method according to claim 6, wherein the wireless local area network device associated with the D3 event is powered down after the powering down of the other wireless local area network devices.

9. A method of utilizing an insertion event in managing a wireless local area network device in a network system, the method comprising:
   receiving a user input to power on a system, the system including a plurality of devices including a wireless local area network device;
   powering up the system and powering up the plurality of devices of the system other than the wireless local area network device in response to the received user input to power on the system;
   generating a notification of an insertion event of the wireless local area network device in response to the received user input to power on the system, wherein the notification of the insertion event indicates the insertion of the wireless local area network device into the system;
   sending the notification of the insertion event of the wireless local area network device to a device manager associated with the wireless local area network device; and
   in response to the device manager receiving the notification of the insertion event of the wireless local area network device:
      powering up the wireless local area network device,
      loading a driver of the wireless local area network device, and
      restoring access point connection information of the wireless local area network device.

10. The method according to claim 9, wherein powering up the wireless local area network device includes switching the wireless local area network device into a D0 mode.

11. The method according to claim 10, wherein the D0 event comprises at least one event selected from the group consisting of a wake-up event, a real time clock event, a scheduler event, and a button input event.

12. The method according to claim 10, wherein the driver of the wireless local area network device associated with the D0 event is loaded to recover an access point connection responsive to the D0 event.

13. The method of claim 9, wherein the restored access point connection information of the wireless local area network device comprises access point connection information of the wireless local area network device that was stored when the wireless local area network device was previously powered down.

14. An apparatus for utilizing an insertion event in managing a wireless local area network device, the apparatus comprising:

a plurality of devices, including a wireless local area network device, the wireless local area network device being associated with a device manager; and a system including the device manager, the system being configured to:

receive a user input to power on the apparatus, power up the apparatus and power up the plurality of devices of the apparatus other than the wireless local area network device in response to the received user input to power on the apparatus, generate a notification of an insertion event of the wireless local area network device in response to the received user input to power on the system, wherein the notification of the insertion event indicates the insertion of a request to insert the wireless local area network device into the system, send the notification of the insertion event of the wireless local area network device to the device manager, and in response to the device manage receiving the notification of the insertion event:

power up the wireless local area network device, load a driver of the wireless local area network device, and restore access point connection information of the wireless local area network device.

* * * * *